United States Patent [19]
Hoogen-Doorn et al.

[11] Patent Number: 5,933,290
[45] Date of Patent: Aug. 3, 1999

[54] RECORDING AN INFORMATION SIGNAL ON A RECORD CARRIER PROVIDED WITH TRACKING SIGNALS

[75] Inventors: Abraham Hoogen-Doorn; Johannes J. W. Kalfs, both of Eindhoven, Netherlands

[73] Assignee: OnStream Inc., Coveland, Colo.

[21] Appl. No.: 08/744,798

[22] Filed: Nov. 6, 1996

[30]     Foreign Application Priority Data

Nov. 21, 1995  [EP]  European Pat. Off. .............. 95203192

[51] Int. Cl.⁶ ...................................................... G11B 5/596
[52] U.S. Cl. .................................... 360/78.12; 360/78.02; 360/77.12
[58] Field of Search .............................. 360/77.14, 77.15, 360/77.12, 30, 75.02, 78.02, 39

[56]            References Cited

U.S. PATENT DOCUMENTS

| | | | |
|---|---|---|---|
| 3,604,858 | 9/1971 | Doi | 360/13 |
| 4,056,832 | 11/1977 | De Boer et al. | 360/77 |
| 4,318,141 | 3/1982 | Haynes | 360/77 |
| 4,586,094 | 4/1986 | Chambors | 360/77 |
| 4,639,793 | 1/1987 | Goldmann | 360/44 |
| 5,267,098 | 11/1993 | Lakhoff | 360/50 |
| 5,432,652 | 7/1995 | Comeaux | 360/77.12 |
| 5,452,150 | 9/1995 | Henneberger | 360/74.4 |

*Primary Examiner*—Aristotelis M. Psitos
*Assistant Examiner*—Joseph M Vann
*Attorney, Agent, or Firm*—Welsh & Katz, Ltd.

[57]            ABSTRACT

An apparatus for recording an information signal on a record carrier where the record carrier has a first and a second tracking signal of specific frequencies and wavelengths. The tracking signals are recorded in respective first and second tracks which run parallel to each other in their longitudinal direction on the record carrier. The apparatus is provided With a receiver for receiving the information signal, and a converter for converting the information signal into a channel signal. The channel signal includes signal blocks of information with each signal block including a portion of the information signal. A writing head writes the channel signal in a third track on the record carrier. A reading head is adapted to read at least one of the first and second tracking signals from the first and second tracks. A generator generates a control signal from the at least first and second tracking signals read from the record carrier. The apparatus is adapted to record the information signal on the record carrier so that the length of a signal block of the channel signal is equal to an integer multiple of the wavelength of one of the first and second tracking signals.

22 Claims, 4 Drawing Sheets

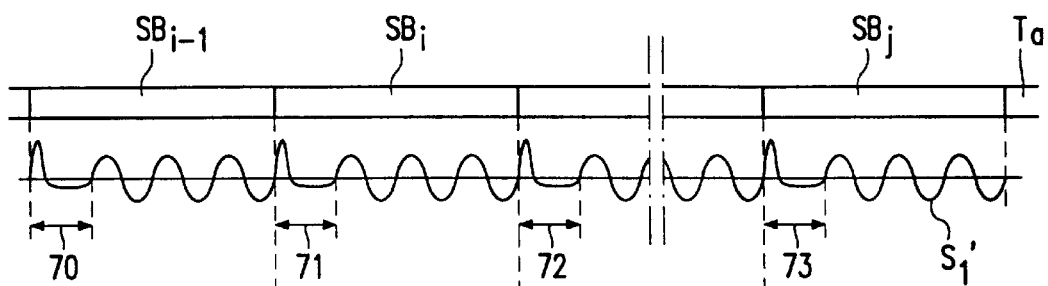
FIG. 9A
FIG. 9B
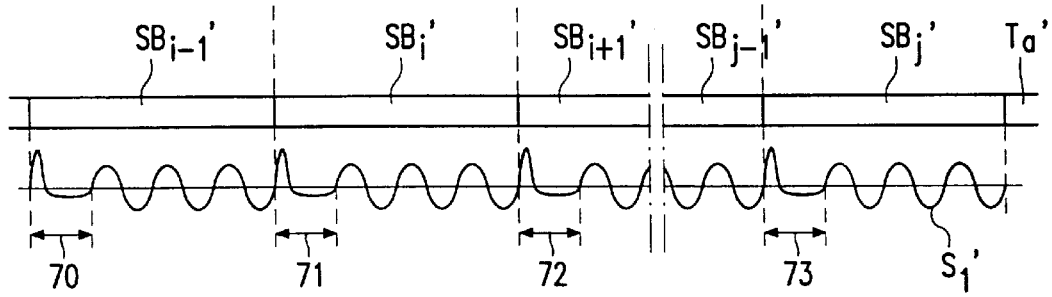
FIG. 9C

RECORDING AN INFORMATION SIGNAL ON A RECORD CARRIER PROVIDED WITH TRACKING SIGNALS

BACKGROUND OF THE INVENTION

1. Field of the Invention

The invention relates to an apparatus for recording an information signal on a record carrier, the record carrier having a first and a second tracking signal of specific frequencies and wavelengths recorded in respective first and second tracks running parallel to each other in their longitudinal direction on the record carrier, the apparatus being provided with

- means for receiving the information signal,
- means for converting the information signal into a channel signal, the channel signal comprising subsequent signal blocks of information, each signal block comprising a portion of the information signal,
- means for writing the channel signal in a third track on the record carrier and reading at least one of the first and second tracking signals from said first and second tracks,
- generating means for generating a control signal from the at least one of the first and second tracking signals read from the record carrier, and to a record carrier obtained with the apparatus.

2. Description of the Related Art

An apparatus as defined in the opening paragraph is known from U.S. Pat. No. 4,318,141, document D1 in the list of documents given at the end of this specification. The tracking signals are prerecorded deeply in tracks lying side-by-side to each other on the record carrier. In a later recording step for recording the information signal, the information signal is recorded in a third track which lies exactly half over the first track and half over the second track.

SUMMARY OF THE INVENTION

The invention aims at providing an improved recording of the information signal. The recording apparatus in accordance with the invention is characterized in that the apparatus is adapted to record the information signal in the record carrier in such a way in response to said control signal that the length of a signal block of the channel signal, when recorded in the third track, equals an integer number of the wavelength of the said at least one of the first and the second tracking signals. More specifically, the record carrier is characterized in that the apparatus is adapted to write a signal block in the third track such that the start of the signal blocks coincides with a specified position within a wavelength of the said one of the first and second tracking signals, and that the specified position within the wavelength is a zero-crossing of the said one of the first and second tracking signals.

The invention is based on the following recognition. Recording of information signals may mean that an information signal is recorded on a 'virgin' record carrier, which comprises the tracking signals only (the original recording mode). Information signals can however also be recorded on the record carrier in an overwriting mode on an information signal recorded earlier (an insert mode of operation), or can be recorded directly after an information signal that has been recorded earlier (an append mode of operation).

In the insert and append mode, boundaries occur between the remaining old information and the newly recorded information. It is of importance that those boundaries will not lead to any distortion when reading old and new information from the record carrier. In accordance with the invention, the length of the signal blocks recorded in the track are made equal to an integer number of the wavelength of one of the first and second tracking signals.

When both tracking signals have the same frequency and thus wavelength, the signal blocks thus have a fixed length expressed in number of wavelength of the tracking signals. When detecting the length of the wavelength of the tracking signal recorded in a track, this means that, during recording (either in the original recording mode or in the append mode or in the insert mode), the signal blocks of information recorded on the record carrier have always the same length.

Further, when starting the recording of a signal block at the specified location in the wavelength of a tracking signal, and further, when identifying groups of n subsequent wavelengths in the track, where n is equal to the above defined specified integer number, it is possible to record the signal blocks in fixed locations on the record carrier. This enables the recording of a signal block exactly onto a signal block recorded earlier on the record carrier in an insert mode of operation. As a result, signal blocks are recorded substantially completely onto signal blocks earlier recorded, so that no partly overwritten signal blocks of old data will be present. The reading of such data is thus not disturbed when reading old and new data after each other.

The tracking frequencies are different in U.S. Pat. No. 4,318,141. Preferably, however, the specific frequencies of the first and second tracking signals are substantially the same and the first and second tracking signals differ in phase.

It should be noted that tracking signals having the same frequency but different phase are known from U.S. Pat. No. 4,056,832, document D2 in the list of related documents.

It should further be noted that, instead of having the third track recorded half over both the first and the second tracks, the third track may lie between the first and second tracks.

BRIEF DESCRIPTION OF THE DRAWING

These and other aspects of the invention will be apparent from and further elucidated with reference to the embodiments described hereafter.

FIG. 9 shows the edit mode of operation.

DETAILED DESCRIPTION OF THE PREFERRED EMBODIMENTS OF THE INVENTION

Figure 1:
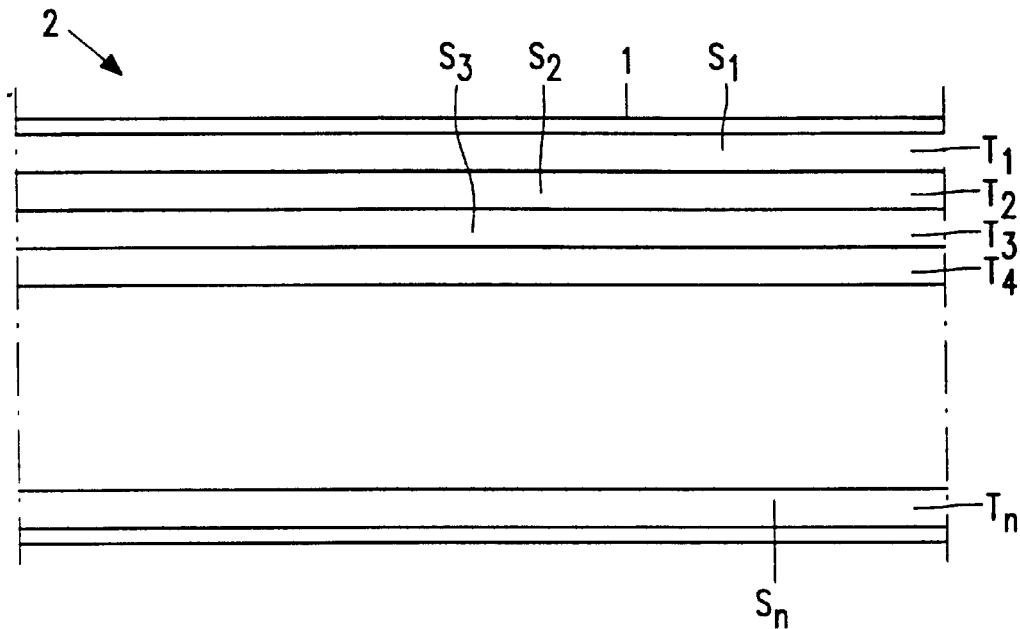
FIG. 1 shows an embodiment of the record carrier, provided with the tracks having tracking signals recorded in them.

FIG. 1 shows an embodiment of a record carrier 2. Only a part of the record carrier is shown. On the record carrier 2, tracks $T_1, T_2, \ldots, T_n$ are present. The tracks run parallel to each other in their longitudinal direction. A first tracking signal S1 has been recorded in the track $T_1$. A second tracking signal S2 has been recorded in the track $T_2$. A third tracking signal S3 has been recorded in the track $T_3$. An n-th tracking signal Sn has been recorded in the track $T_n$.

The tracking signals are signals of relatively low frequency, compared to the frequency components of the information signal that will be recorded later on the record carrier. As the frequency of the tracking signals is relatively low, those tracking signals will be (have been) recorded deeply in the record carrier so that a later recording of the information signal will not result in an erasing of the tracking signals. The tracking signals in two neighbouring tracks may have different frequencies. Preferably, however, the tracking signals have the same frequency and tracking signals in neighbouring tracks have a different phase. More specifically, the phase difference between the tracking signals of adjacent tracks is 180°.

The tracks are shown, lying side-by-side, without a guard band between the tracks. A guard band may however be present between the tracks. The guard band may be so broad that the data tracks comprising the recorded information signal fit in between two neighbouring tracks comprising tracking signals.

Figure 2:
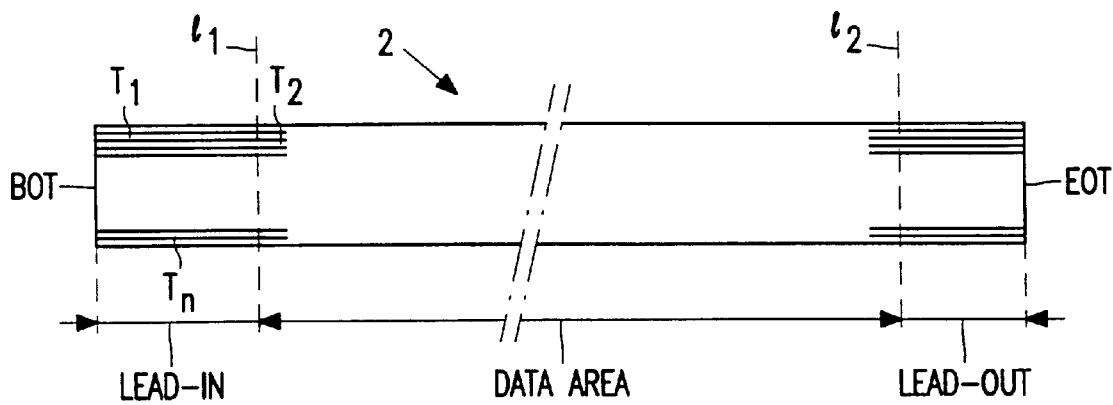
FIG. 2 shows schematically the record carrier over its total length.

FIG. 2 shows the record carrier 2 again, now schematically over its total length. The start end of the record carrier 2 is indicated by BOT (beginning-of-tape) and the final end is indicated by EOT (end-of-tape). A lead-in portion and a lead-out portion are shown, being the portions between the start end (BOT) of the record carrier and the line $l_1$ and the final end (EOT) of the record carrier and the line $l_2$ respectively. A data area for recording the information signal is available between the lead-in portion and the lead-out portion of the record carrier 2.

Figure 3:
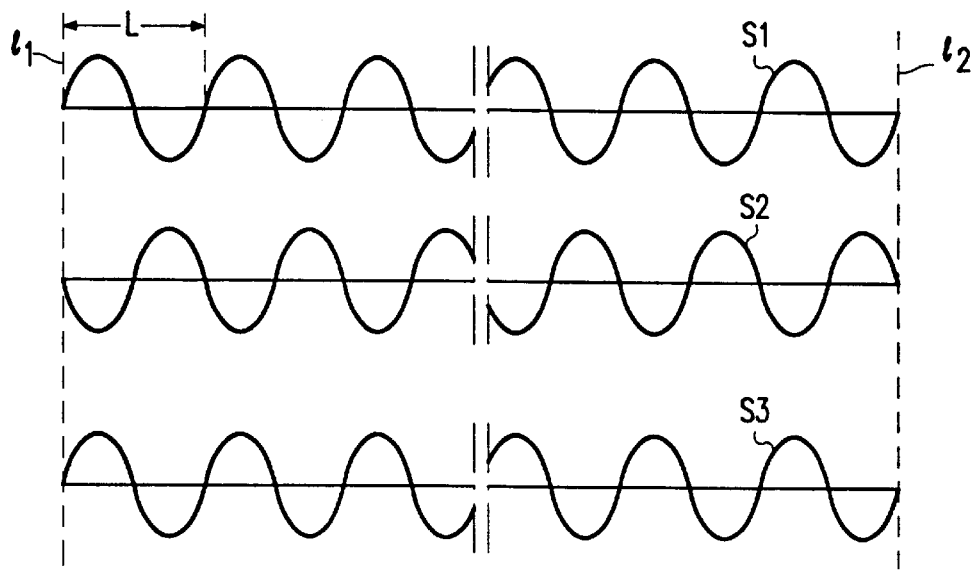
FIG. 3 shows an example of tracking signals recorded in three neighbouring tracks.

FIG. 3 shows an example of the tracking signals $S_1$, $S_2$ and $S_3$ as recorded in the data area portion between the lines $l_1$ and $l_2$ of the tracks $T_1$, $T_2$ and $T_3$ respectively. FIG. 3 shows a tracking signal in the track $T_1$ in the form of a sinusoid having a specific frequency and wavelength L. The duty cycle of the sinusoid is ½, as usual for a normal sinusoid. The duty cycle may however be different from ½.

FIG. 3 further shows the tracking signal $S_2$ in the form of a sinusoid having a specific frequency and wavelength, which are in this example equal to the frequency and the wavelength respectively of the tracking signal $S_1$. The tracking signal $S_2$ differs from the tracking signal $S_1$, in that its phase differs by 180° from the phase of the tracking signal $S_1$. In other words: the tracking signal $S_2$ differs in polarity from the tracking signal $S_1$. FIG. 3 also shows the tracking signal $S_3$ in the form of a sinusoid having a specific frequency and wavelength, which are in this example also equal to the frequency and the wavelength respectively of the tracking signal $S_1$. The tracking signal $S_3$ differs from the tracking signal $S_2$, in that its phase differs by 180° from the phase of the tracking signal $S_2$. In other words: the tracking signal $S_3$ differs in polarity from the tracking signal $S_2$, and is thus equal to the tracking signal $S_1$.

Figure 4:
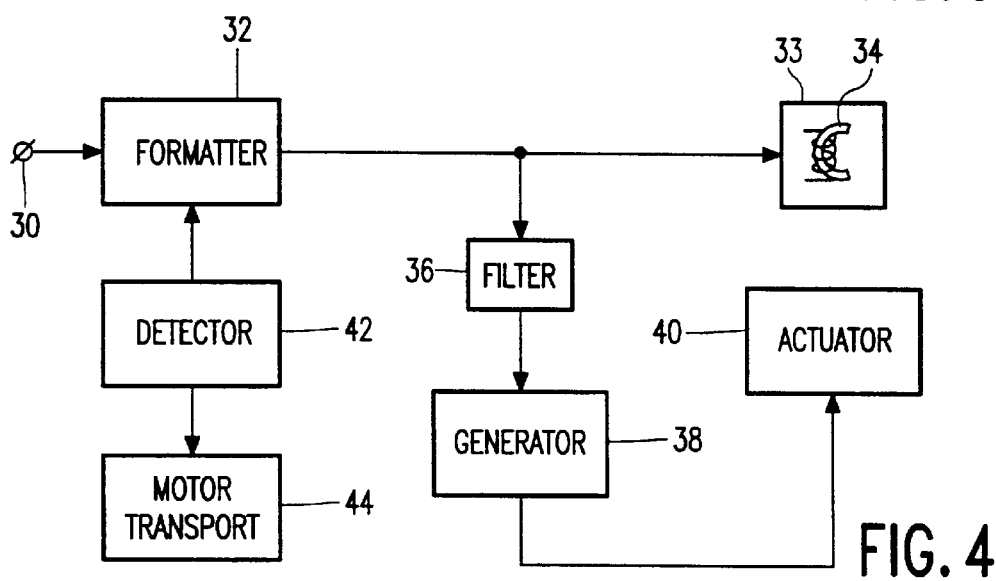
FIG. 4 shows an embodiment of the recording apparatus for recording the information signal on the record carrier.
Figure 5:
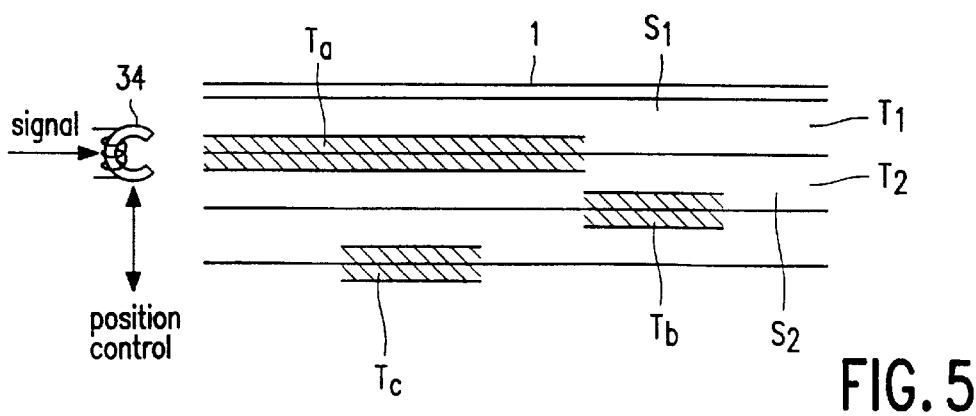
FIG. 5 shows the record carrier with the tracks comprising the tracking signals and the tracks comprising an information signal.

FIG. 4 shows an embodiment of an apparatus for recording an information signal on the record carrier 1 of FIG. 1 and 2, which has the tracking signals shown in FIG. 3 prerecorded on it. FIG. 5 shows how the information signal is recorded on the record carrier 1. A track $T_a$ is recorded exactly on the boundary line between two adjacent tracks of tracking signals, such as the tracks $T_1$ and $T_2$. The apparatus of FIG. 4 has an input terminal 30 for receiving the information signal. The input terminal is coupled to an input of a formatter unit 32, which converts the information signal into a format suitable for recording on the record carrier 1. An output of the formatter unit 32 is coupled to a write unit 33 comprising a write/read head 34. The formatted information signal is supplied to the write/read head 34 and recorded in the track $T_a$ on the record carrier 1. The head 34 is further adapted to read the tracking signals recorded in the tracks $T_1$ and $T_2$. The tracking signals are supplied to a filter unit 36, which has a bandpass filter characteristic with a centre frequency equal to the specific frequency of the tracking signals. As the frequency of the tracking signals is low relative to the frequency content of the formatted information signal, it is possible to read the tracking signals from the tracks $T_1$ and $T_2$, while writing the formatted information signal into the track $T_a$.

When the head 34 is located exactly half way on the tracks $T_1$ and $T_2$, tracking signals of equal amplitude but opposite phase are read from the tracks $T_1$ and $T_2$. As a result, a substantially zero amplitude signal is supplied by the filter 36 to the generator unit 38. The generator unit 38 supplies a control signal to an actuator unit 40 in response to the signal applied by the filter 36. The actuator unit 40 may comprise a positioning unit (not shown) to position the head 34 in a direction transverse to the tracks. In the situation described above, where the head is positioned exactly half way on the two tracks $T_1$ and $T_2$, no repositioning of the head 34 is required. If the head is positioned for a larger part on the track $T_1$, the tracking signal read from the track $T_1$ will have a larger amplitude than the signal read from the track $T_2$. This means that a non-zero amplitude signal will be supplied by the filter 36 to the generator unit 38. The generator unit 38 now generates a control signal for the actuator unit 40, such that the head 34 is moved in a specific direction towards a position leading to an decrease in amplitude of the signal applied by the filter 36 to the generator 38.

If the head 34 is positioned for a larger part on the track $T_2$, the tracking signal read from the track $T_2$ will have a larger amplitude than the signal read from the track $T_1$. This means that, again, a non-zero amplitude signal will be supplied by the filter 36 to the generator unit 38. The generator unit 38 now generates a control signal for the actuator unit 40, such that the head 34 is moved in the other direction towards a position leading to an decrease in amplitude of the signal applied by the filter 36 to the generator 38.

The formatter unit 32 converts the information signal into signal blocks comprising portions of the information signal. Generally, the formatter unit further comprises a channel encoder, well known in the art, for channel encoding the information signal. Subsequent signal blocks of information are thus supplied to the head 34 and recorded in the track $T_a$. It should be noted here that the signal blocks may commence with half an interframe gap and may terminate with half an interframe gap, so that, when recorded after each other interframe gaps are present in the tracks separating the signal portions comprised in subsequent signal blocks. Or, the signal blocks commence or end with a complete interframe gap. For a description of interframe gaps, reference is made to U.S. Pat. No. 5,267,098, document D3 in the list of related documents. The length of the interframe gaps on the record carrier may be equal to an integer number of wavelength of the first tracking signal, or may be smaller or larger than said wavelength, whilst being unequal to an integer number of said wavelength.

Figure 6:
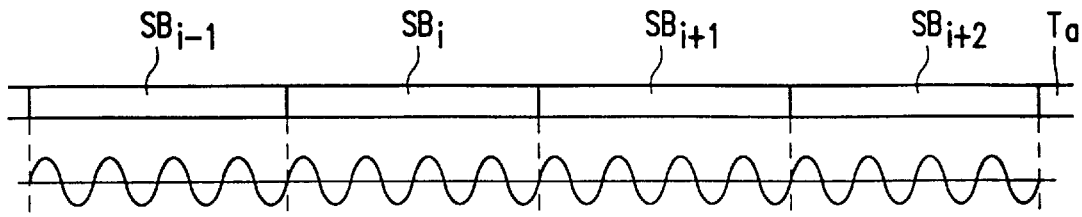
FIG. 6 shows an embodiment of the tracking signal as recorded in the first or second track and the signal blocks recorded in the third track.

FIG. 6 shows the signal blocks as recorded in the track $T_a$. More specifically, signal blocks . . . , $SB_{i-1}$, $SB_i$, $SB_{i+1}$, $SB_{i+2}$, ... are recorded in the track $T_a$. Further, FIG. 6 shows the tracking signal as recorded in one of the tracks $T_1$ and $T_2$. As can be seen, in the present example, the length of the signal blocks in the track $T_a$ equals 4 times the wavelength of the tracking signal recorded in the track $T_1$ or $T_2$. More specifically, the start of a signal block coincides with a zero crossing of the tracking signal, that is, coincides with the positive going zero crossing in the tracking signal.

Detection of a positive zero crossing results in an exact location of the signal blocks in the length direction of the track $T_a$, when recording the signal blocks in said track.

A detector unit 42 is present, see FIG. 4, for detecting the zero crossings in a tracking signal. In the present example, the detector unit 42 comprises any detector (not shown) to detect the zero crossings in one of the tracks $T_1$ or $T_2$. As an example, an additional read head (not shown) may be present to read the tracking signal from the track $T_1$ only. The detector 42 generates a control signal in response to a detection of a positive going zero crossing, which control signal is supplied to the formatter unit 32. The formatter unit 32 generates the signal blocks and supplies the signal blocks to its output in response to the control signal so that the signal blocks are recorded in the track $T_a$, such that they are positioned in relation to the tracking signal in the track $T_1$ or $T_2$ as shown in FIG. 6.

Figure 7:
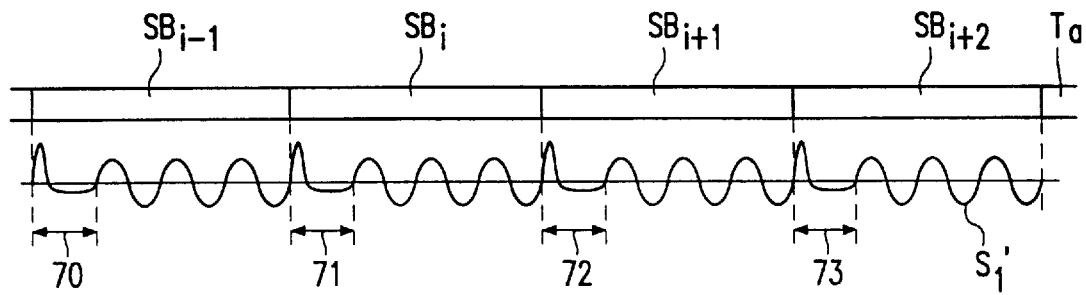
FIG. 7 shows another embodiment of the tracking signal and the signal blocks recorded in the third track.

In a preferred embodiment, the tracking signals have a slightly different shape. This is shown in FIG. 7, which shows the tracking signal $S_1'$, recorded in the track $T_1$. As can be seen in the FIG. 7, one sinusoid in a group of four sinusoids have a shape which is slightly modified compared to the shape of the other sinusoids. More specifically, the said modified sinusoids, indicated by the reference numerals 70 to 73, have a duty cycle which is different from the duty cycle of the other unmodified sinusoids. The duty cycle of the unmodified sinusoids is ½, whereas the duty cycle of the modified sinusoids 70 to 73 are eg. equal to ¼, or ¾. In the present embodiment, the positive going zero crossing of the modified sinusoids 70 to 73 indicate the start positions of the signal blocks $SB_{i-1}$ to $SB_{i+2}$, as can clearly be seen in FIG. 7.

The detector 42 is now capable of detecting the modified sinusoids 70 to 73, and more specifically, the positive going zero crossings of those sinusoids, so that it can generate a control signal in response thereto. The formatter unit 32 is capable of supplying the signal blocks to its output, in response to the control signal, such that the signal blocks are recorded in the track $T_a$ in the way shown in FIG. 7.

Editing of a record carrier previously recorded with an information signal, can now be realized by detecting the modified sinusoids 70 to 73 and recording the signal blocks in the tracks recorded earlier such that the start of a signal block in a track coincides with a positive going zero crossing of one of the modified sinusoids 70 to 73, and that the end of said signal block coincides with the positive going zero crossing of the next modified sinusoid. In this way, a signal block newly recorded can be recorded exactly. onto a signal block recorded earlier, so that in an insert mode of operation, there is a smooth going over between old and new data recorded in the track.

The modification of the one out of n (=4) sinusoids is shown not only as a change of the duty cycle, but resides also in the fact that the positive signal wave, which as modified is shorter than in the unmodified situation, has a higher amplitude than unmodified, and that the negative signal wave, which as modified is longer than in the unmodified situation, has a lower amplitude than unmodified. In this way, the DC component in the tracking signal does not change.

When recording the information signal in the track $T_a$, the record carrier is transported by the motor transport unit 44. The detector unit 42 not only controls the formatter so as to supply the signal blocks at the right moment to its output, but also controls the motor transport unit 44, so that the record carrier is transported at the required velocity so that the signal blocks as recorded exactly fit between two modified sinusoids, as explained above.

After having recorded the information signal in the track $T_a$, and having reached the end of the track $T_a$, the head 34 is positioned on the boundary line between the tracks $T_2$ and $T_3$, so that a track $T_b$ comprising the recorded information signal, see FIG. 5, can be recorded on the record carrier. The record carrier is now transported in opposite direction compared to the direction of transport when recording the information signal in the track $T_a$.

Upon reaching the other end of the record carrier, the motor transport unit 44 will either stop the transport of the record carrier, or reverse the transport direction of the record carrier 1. In the latter case, the head 34 will be positioned on another track. As an example, after having recorded the information signal in the track $T_b$, the head 34 is positioned on the boundary line between the tracks $T_3$ and $T_4$, so that a track $T_c$ comprising the recorded information signal, see FIG. 5, can be recorded on the record carrier.

Figure 8A:
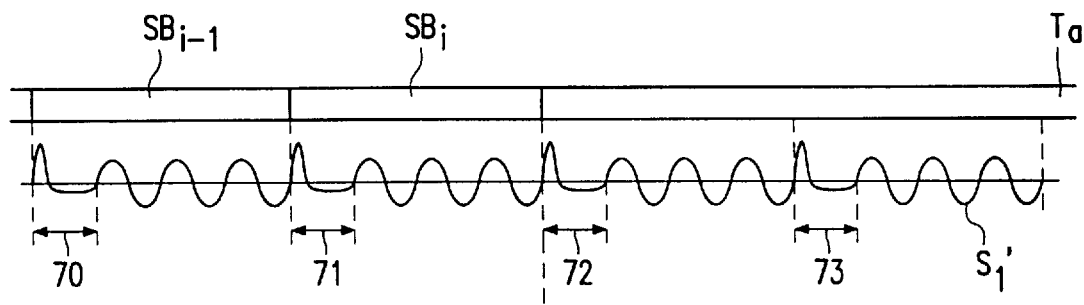
FIGS. 8A–8C shows the append mode of operation.
Figure 8C:
Figure 8B:
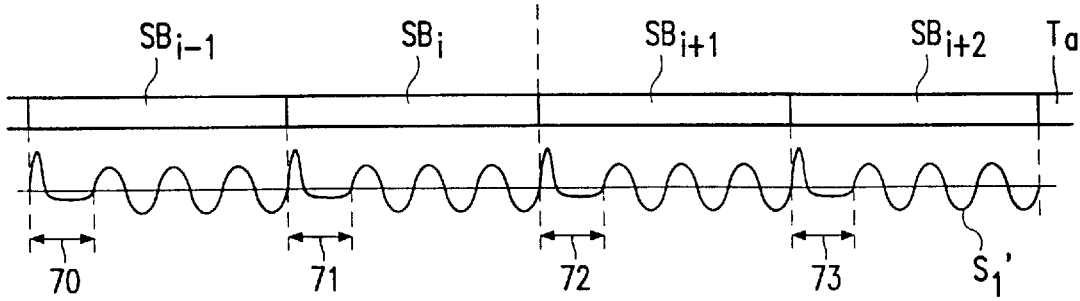

FIGS. 8A–8C shows the append mode of operation. In FIG. 8A, the track $T_a$ is shown having signal blocks of an information signal recorded in it. The last signal block recorded is the signal block $SB_i$. In the append mode of operation, signal blocks need to be recorded directly after the last signal block recorded earlier. The recording apparatus can establish where the last signal block $SB_i$ has been recorded and upon detection of the modified sinusoid 72, a control signal shown in FIG. 8C is supplied to the formatter unit 32, so that the first signal block $SB_{i+1}$ is recorded directly after the signal block $SB_i$ in the track $T_a$, see FIG. 8B.

FIGS. 9A–9C shows the edit mode of operation. In FIG. 9A, the track $T_a$ is shown having signal blocks of an information signal recorded in it. In the edit mode of operation, signal blocks need to be recorded directly onto signal blocks recorded earlier. More specifically, signal blocks of information need to be recorded on the record carrier, starting with overwriting the signal block $SB_i$. The recording apparatus can establish where the previous signal block $SB_{i-1}$ has been recorded and upon detection of the modified sinusoid 71, a control signal shown in FIG. 9B is supplied to the formatter unit 32, so that the first signal block $SB_i'$ is recorded directly onto the signal block $SB_i$ in the track $T_a$. Subsequent signal blocks $SB_{i+1}'$ to $SB_{j-1}'$ are recorded exactly onto the signal blocks $SB_{i+1}$ to $SB_{j-1}$ recorded earlier. As can be seen in FIG. 9C, the boundaries between the old data and the new data lie exactly on the boundaries originally present between the signal blocks.

The invention thus relates to the recording of an information signal in a track on a record carrier. Signal blocks comprising portions of the information signal are recorded in a track in such a way that the length of a signal block equals an integer number of the wavelength of the tracking signal recorded earlier in a track.

Whilst the present invention has been described with respect to preferred embodiments thereof, it is to be understood that these are not limitative examples. Thus, various modifications may become apparent to those skilled in the art, without departing from the scope of the invention, as defined in the appended claims. As an example, the record carrier may be one of the longitudinal type, or from the disk type. The tracking signals need not necessarily be sinusoids, but may has a different shape, as long as they are periodic with a specific wavelength.

Related Documents (D1) U.S. Pat. No. 4,318,141
(D2) U.S. Pat. No. 4,056,832 (PHN 7630)
(D3) U.S. Pat. No. 5,267,098 (PHN 13.281)

We claim:

1. Apparatus for recording an information signal on a record carrier, the record carrier having a first and a second tracking signal of specific frequencies and wavelengths recorded in respective first and second tracks running parallel to each other in their longitudinal direction on the record carrier, the apparatus being provided with means for receiving the information signal, means for converting the received information signal into a channel signal, the channel signal comprising subsequent signal blocks of information, each signal block comprising a portion of the information signal, means for writing the channel signal in a third track on the record carrier, means for reading at least one of the first and second tracking signals from said first and second tracks, generating means for generating a control signal from the at least one of the first and second tracking signals read from the record carrier, characterized in that the apparatus is adapted to record the information signal in the record carrier in such a way in response to said control signal that the length of a signal block of the channel signal, when recorded in the third track equals an integer multiple of the wavelength of the said at least one of the first and the second tracking signals.

2. Apparatus as claimed in claim 1, characterized in that said means for writing the channel signal writes said signal blocks in the third track such that the start of the signal blocks coincides with a specified phase angle of the said one of the first and second tracking signals.

3. Apparatus as claimed in claim 2, characterized in that, the phase angle is a zero-crossing of the said one of the first and second tracking signals.

4. Apparatus as claimed in claim 3, characterized in that the generating means is adapted to generate said control signal so that said control signal has a relationship with the wavelength of the said one of the first and the second tracking signals, the apparatus being adapted to record the information signal in the record carrier in response to the control signal, such that the length of a signal block equals said integer number of the wavelength of said one of the first and the second tracking signals.

5. Apparatus as claimed in claim 3, characterized in that the generating means is adapted to generate said control signal so that said control signal has a relationship with the wavelength of the said one of the first and the second tracking signals and with the specified position in said wavelength, the apparatus being adapted to record the information signal in the record carrier in response to the control signal, such that the length of a signal block equals said integer number of the wavelength of said one of the first and the second tracking signals and that the start of the signal block coincides with said specified position.

6. Apparatus as claimed in claim 5, for recording an information signal on a record carrier on which in an earlier recording step a previous information signal has been recorded in said third track, characterized in that the apparatus is adapted to write a signal block in the third track such that the signal block newly recorded in said third track is recorded exactly onto a signal block previously recorded in said third track.

7. Apparatus as claimed in claim 6, characterized in that the apparatus further comprises detector means for detecting modified portions in the at least one of the first and second tracking signals recorded in the first or second track respectively.

8. Apparatus as claimed in claim 3, further comprising a second information signal recorded on said record carrier before said information signal characterized in that the apparatus is adapted to write a signal block in the third track such that the signal block of said information signal in said third track is recorded substantially exactly onto a signal block of said second information signal recorded in said third track.

9. Apparatus as claimed in claim 3, characterized in that the apparatus further comprises detector means for detecting modified portions in the at least one of the first and second tracking signals recorded in the first or second track respectively.

10. Apparatus as claimed in claim 2, characterized in that the generating means is adapted to generate said control signal so that said control signal has a relationship with the wavelength of the said one of the first and the second tracking signals and with the specified position in said wavelength, the apparatus being adapted to record the information signal in the record carrier in response to the control signal, such that the length of a signal block equals said integer number of the wavelength of said one of the first and the second tracking signals and that the start of the signal block coincides with said specified position.

11. Apparatus as claimed in claim 2, characterized in that the generating means adapted to generate said control signal so that said control signal has a relationship with the wavelength of the said one of the first and the second tracking signals, the apparatus being adapted to record the information signal in the record carrier in response to the control signal, such that the length of a signal block equals said integer number of the wavelength of said one of the first and the second tracking signals.

12. Apparatus as claimed in claim 2, further comprising a second information signal recorded on said record carrier before said information signal characterized in that the apparatus is adapted to write a signal block in the third track such that the signal block of said information signal in said third track is recorded substantially exactly onto a signal block of said second information signal recorded in said third track.

13. Apparatus as claimed in claim 2, characterized in that the apparatus further comprises detector means for detecting modified portions in the at least one of the first and second tracking signals recorded in the first or second track respectively.

14. Apparatus as claimed in claim 1, characterized in that the generating means is adapted to generate said control signal so that said control signal has a relationship with the wavelength of the said one of the first and the second tracking signals, the apparatus being adapted to record the information signal in the record carrier in response to the control signal, such that the length of a signal block equals said integer number of the wavelength of said one of the first and the second tracking signals.

15. Apparatus as claimed in claim 14, for recording an information signal on a record carrier on which in an earlier recording step a previous information signal has been recorded in said third track, characterized in that the apparatus is adapted to write a signal block in the third track such that the signal block newly recorded in said third track is recorded exactly onto a signal block previously recorded in said third track.

16. Apparatus as claimed in claim 1, further comprising a second information signal recorded on said record carrier before said information signal characterized in that the apparatus is adapted to write a signal block in the third track such that the signal block of said information signal in said third track is recorded substantially exactly onto a signal block of said second information signal recorded in said third track.

17. Apparatus as claimed in claim 1, characterized in that the apparatus comprises detector means for detecting modified portions in the at least one of the first and second tracking signals recorded in the first or second track respectively.

18. An apparatus as claimed in claim 1 wherein said generating means generates said control signal in response to a pre-selected phase angle of one of said first and second tracking signals.

19. Record carrier having a first and a second tracking signal of specific frequencies and wavelengths recorded in respective first and second tracks running parallel to each other in their longitudinal direction on the record carrier, an information signal being recorded in a third track running parallel to the first and second tracks on the record carrier, characterized in that signal blocks comprising portions of the information signal are recorded in said third track, such that the length of a signal block, when recorded in the third track equals an integer multiple of the wavelength of one of the first and the second tracking signals.

20. Record carrier as claimed in claim 19, characterized in that the signal blocks are recorded in the third track, such that the start of the signal blocks coincides with a specified phase angle of the said one of the first and second tracking signals.

21. Record carrier as claimed in claim 20, characterized in the at the specified phase angle is a zero-crossing of the said one of the first and second tracking signals.

22. An apparatus for recording an information signal on a record carrier comprising:

said information signal being converted into a plurality of channel signal blocks, each of said channel signal blocks including a portion of said information signal and further having a length;

at least a first tracking signal having a wavelength; and said apparatus being effective to record said signal blocks onto said record carrier so that said length of each of said signal blocks is equal to an integer multiple of said wavelength of said at least a first tracking signal.

* * * * *